(12) United States Patent
Ishiguro et al.

(10) Patent No.: US 6,647,779 B2
(45) Date of Patent: Nov. 18, 2003

(54) TEMPERATURE SENSING RESISTANCE ELEMENT AND THERMAL FLOW SENSOR USING SAME

(75) Inventors: Fujio Ishiguro, Nagoya (JP); Zenji Ishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/156,516

(22) Filed: May 28, 2002

(65) Prior Publication Data

US 2002/0189342 A1 Dec. 19, 2002

(30) Foreign Application Priority Data

Jun. 4, 2001 (JP) ........................................ 2001-168294

(51) Int. Cl.[7] .............................................. G01F 1/68
(52) U.S. Cl. ................................................... 73/204.26
(58) Field of Search ......................... 73/204.26, 204.25, 73/204.27; 374/148, 185; 338/7–10, 296–305

(56) References Cited

U.S. PATENT DOCUMENTS

| 3,858,147 | A | * | 12/1974 | Caddock | ...................... | 338/62 |
| 3,921,119 | A | * | 11/1975 | Caddock | ...................... | 338/217 |
| 4,559,814 | A | * | 12/1985 | Sato et al. | .................. | 73/118.2 |
| 5,094,105 | A | * | 3/1992 | Emmert, Jr. et al. | ..... | 73/204.25 |
| 5,465,618 | A | * | 11/1995 | Yasui et al. | ............... | 73/204.27 |
| 5,889,459 | A | * | 3/1999 | Hattori et al. | .................. | 338/9 |

FOREIGN PATENT DOCUMENTS

| JP | 56-96326 | 8/1981 |
| JP | 07-113693 | 5/1995 |
| JP | 2001-091366 | 4/2001 |

OTHER PUBLICATIONS

*Sensor Technology*, vol. 9, No. 10, Sep. Issue, 1989, pp. 23–27, 29, 112.

* cited by examiner

*Primary Examiner*—Edward Lefkowitz
*Assistant Examiner*—Jewel V. Thompson
(74) *Attorney, Agent, or Firm*—Burr & Brown

(57) ABSTRACT

A temperature sensing resistance element includes a substrate made of an insulating material, a temperature sensing resistor formed on at least a part of the outer peripheral surface of the substrate to connect both ends of the substrate, a cap-shaped conducting member being electrically connected to the temperature sensing resistor and disposed at each end of the substrate, and a protective film covering at least the temperature sensing resistor. A gap is defined by an inner surface an enlarged portion of the conducting member and a part of the outer surface of the substrate, and the gap is widened gradually toward the end of the opening of the conducting member.

10 Claims, 2 Drawing Sheets

Prior Art

TEMPERATURE SENSING RESISTANCE ELEMENT AND THERMAL FLOW SENSOR USING SAME

BACKGROUND OF THE INVENTION AND RELATED ART STATEMENT

The present invention relates to a temperature sensing resistance element being preferably used as a component of a thermal flow sensor for measuring the flow rate of intake air in an internal combustion engine for an automobile, for example.

For example, it may sometimes be necessary to measure the flow rate of intake air for adjusting a fuel injection valve in an internal combustion engine for automobile ect. There is known, as a sensor for preforming such measurements ("Sensor Technology" page 25, September issue, 1989), a thermal flow sensor utilizing a resistor whose resistance value increases as temperature goes up (hereinafter referred to as a "temperature sensing resistance element").

As the temperature sensing resistance element for a thermal flow sensor, there is known, for example, a resistance element of a structure comprising, as shown in FIG. 4, a cylindrical substrate 23 being made of an insulating material, a temperature sensing resistor 22 formed on the outer peripheral surface of the substrate 23 so as to connect both ends of the substrate 23, and a conducting member 24 such as a lead wire; the member being electrically connected to the temperature sensing resistor 22 with extending from both ends of the substrate 23 (See Japanese Utility Model Laid-Open No 56-96326. etc.

In the above-described resistance element, however, the element has problems that the electrical connections between the temperature sensing resistor and the lead wires become defective frequently since a satisfactory fixation of the lead wire is difficult, and that the lead wire is apt to slip off due to the influence of vibrations etc. during the practical use, even if the electrical connections are good during manufacturing.

In order to solve this problem, one may think out a temperature sensing resistance element in which both ends of the substrate is provided with cap-shaped conducting members and the lead wire is fixed to the conducting members.

However, because it is important for a temperature sensing resistance element for a thermal flow sensor to be able to respond quickly to temperature changes, it is necessary that the size of this temperature sensing resistance element be as small as possible, for example, the outside diameter be 1 mm and the length be within about 3 mm. Similarly, the above-described cap-shaped conducting member is also required to have a small size.

And in pushing the end surfaces of the substrate into this small cap-shaped conducting member, problems also arise: for example, the end surfaces cannot be completely pushed so as to make it contact intimately with the innermost recess of the conducting member; or, even if the end surfaces are pushed completely thereinto, the firm fixation cannot be achieved since there still remains some loose portion in the intermediate space between the conducting member and the base body. With these problems this type of a temperature sensing resistance element might be inferior in reliability to the above-described temperature sensing resistance element of conventional structure.

SUMMARY OF THE INVENTION

The present invention was made in view of the above-described situation, and the object of the present invention is to provide a temperature sensing resistance element having a higher reliability than the temperature sensing resistance element of conventional structure, and a thermal flow sensor excellent in reliability and measuring accuracy by using the temperature sensing resistance element.

According to the present invention, temperature sensing resistance element is provided, which comprises a substrate formed of an insulating material, a temperature sensing resistor formed on at least a part of the outer peripheral surface of this substrate so as to connect both ends of this substrate, a cap-shaped conducting member having an enlarged portion formed at a vicinity of an opening thereof and being electrically connected to the temperature sensing resistor and disposed at each end of this substrate, and a protective film for covering at least the above-described temperature sensing resistor, wherein a gap is defined by an inner surface of the enlarged portion and a part of the outer surface of the substrate, and the gap is widened gradually toward an end of the opening of the conducting member.

Also, according to the present invention, there is provided a temperature sensing resistance element, which comprises a cylindrical substrate made of an insulating material, a temperature sensing resistor formed on the outer peripheral surface of this substrate for connecting both ends of this substrate, a cap-shaped conducting member electrically connected to this temperature sensing resistor and disposed at each end of this substrate, and a protective film for covering at least the above-described temperature sensing resistor, wherein the radius of curvature of both end edges of said substrate is 0.05 mm, or more.

Furthermore, according to the present invention, there is provided a thermal flow sensor in which these temperature sensing resistance elements are built in a bridge circuit.

DETAILED DESCRIPTION OF THE INVENTION

The temperature sensing resistance element (hereinafter referred to simply as "resistance element") of the present invention is characterized in that it has such a construction that cap-shaped conducting members are disposed at both ends of the substrate, and that a gap is defined by an inner surface of the enlarged portion and a part of the outer surface of the substrate, and the gap is widened gradually toward an end of the opening of the conducting member; or that the radius of curvature of both end edges of the above-described substrate is not less than 0.05 mm. The resistance element of the present invention can maintain a-prescribed resistance characteristics even under a harmful use environment, and a thermal flow sensor (hereinafter referred to simply as "sensor") in which this resistance element is built is excellent in reliability and measuring accuracy. The resistance element and sensor of the present invention will be described in detail below.

(1) Characteristics of the Resistance Element of the Present Invention

In the resistance element of the present invention, the lead wire is fixed by the cap-shaped conducting member in order to increase reliability and, at the same time, by minimizing thermal capacity, this resistance element is designed so as to be capable of being used as a temperature sensing resistance element for a thermal flow sensor.

The present invention will be further described in detail by referring to the accompanying drawings. In this respect, note that the following numerical references mean the respective parts, members or the like as specified below: That is, 2 denotes a temperature sensing resistor, 3 denotes a substrate, 3a denotes an end edge, 4 denotes a conducting member, 4a denotes an inner surface near at the opening of the conducting member, 5 denotes a lead wire, 6 denotes a protective film, 7 denotes a gap, 11 denotes a thermal flow sensor, 12 denotes an intake pipe, 13 denotes a transistor, 14 denotes a comparator, 15 denotes a terminal, 16 denotes an electrical output, 17 denotes a bridge circuit, 22 denotes a temperature sensing resistor, 23 denotes a substrate, and 24 denotes a conducting member.

Figure 2:
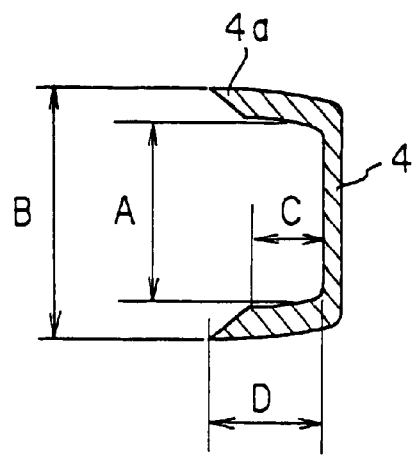
FIG. 2 is a schematic diagram of an example of a conducting member used in the present invention.

The concrete feature of the present invention resides in the point that there is provided a gap widened gradually toward an end of the opening of the conducting member between the inner surface 4a at a vicinity of the opening of a cap-shaped conducting member 4 and the outer surface of a substrate 3 facing to this inner surface 4a. This means that, as shown in FIG. 2, the inside diameter A of the conducting member 4 becomes wider gradually toward the end of the opening. The easier insertion of conducting member 4 into the substrate 3 and the firm fixation of the conducting member 4 to the substrate 3 are simultaneously attained since the inside diameter becomes wider gradually toward the end of the opening in such a manner that the diameter of the conducting member becomes maximal at the end thereof. Furthermore, this may prevent the breakage of the substrate 3 that might be caused by poor engagement between the outer surface of the substrate and the inner surface of the conducting member during insertion. In addition, this construction may offer the effect that a temperature sensing resistor (hereinafter referred to simply as "resistor") 2 formed on the outer peripheral surface of the substrate 3 is prevented from being damaged or being stripped off during insertion into the conducting member.

Furthermore, in the present invention, for example, an end edge 3a of the substrate 3 is chamfered (rounded with a radius) so as to make the radius of curvature the end edge 3a to 0.05 mm or more, thereby an easy and firm insertion of the substrate 3 into the innermost recess of the conducting member 4 becomes possible even if the substrate 4 is a tiny one having an outside diameter of about 0.5 to 1 mm.

In order to ensure positive fixing between the cap-shaped conducting member 4 and the substrate 3, an adhesive may be interposed between the two. If an adhesive is conductive, it is preferable since it may increase the reliability of electrical connections between the conducting member 4 and a resistor 2 formed on the outer peripheral surface of the substrate 3. It is also preferable that the adhesive be an inorganic one in order to increase durability in the case of use for a long period under a poor environment such as those being exposed to high heat, etc.

Figure 1:
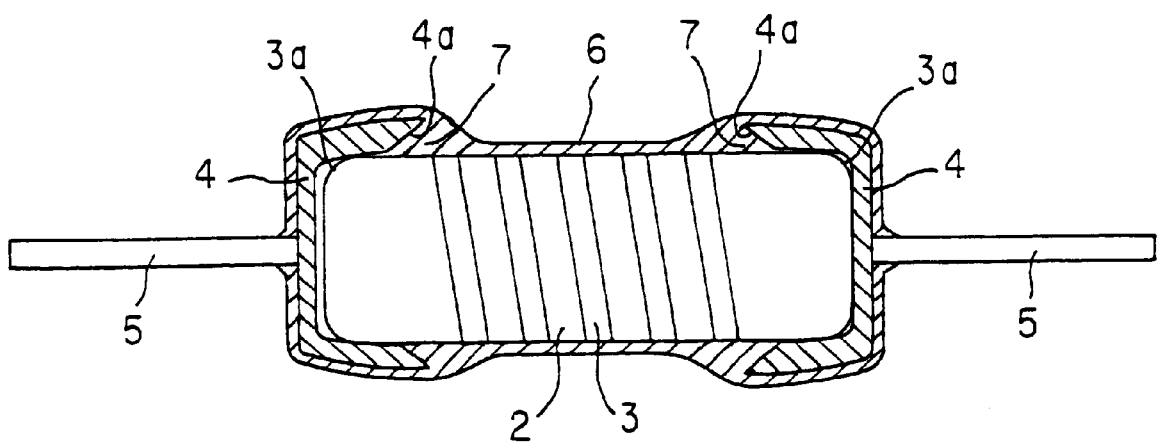
FIG. 1 is a schematic diagram of an example of an embodiment of a temperature sensing resistance element according to the present invention.

The resistance element of the present invention is provided with a protective film 6 that covers at least the resistor 2. As shown in FIG. 1, it is preferable to cover the level-difference portion that is formed at the boundary between the opening of the conducting member 4 and the outer surface of the substrate 3 smoothly with this protective film 6 comprising a continuously curved line. This is because the accumulation of dusts, wastes, oily materials and the like in the body of the resistance element may be reduced greatly, thereby the heat exchange between the sensor and a fluid may be kept in a good condition for a long period of time. Additionally, it is preferable to have such a construction as mentioned above since the reduction in the performance of the resistance element may be prevented since the penetration of a liquid or gas from this boundary may be suppressed. This would prevent the conducting member from disengagement caused by pressure of steam or vapor that might be generated, due to the influence of heat, from a liquid having entered the interior of the resistance element, or prevent it from rust formation in the inner surface of the conducting material caused by the oxidation reaction of a gas having penetrated into the interior of the resistance element.

Also, one may dissolve the problems that arise frequently in the resistance element of conventional construction, inclusive of the slipping-off of the lead wire, by fixing one end of a lead wire 5 by welding etc. to the outer surface of the cap-shaped conducting member 4. This is because the lead wire is strongly bonded to the substrate 3. In terms of the improvement in corrosion resistance and reliability, it is preferred to use a noble metal alloy containing as a major component a noble metal, particularly, platinum, or a base metal core wire covered with a noble metal as a lead wire material.

In fixing the lead wire to the conducting member, it is preferred that the portion of the lead wire near its end be deformed so as to increase the contact area between the lead wire and the conducting member, thereby increasing the bonding force. Furthermore, by making the conducting member material protuberant and fixing the lead wire in a hole portion formed in the center of the protuberance of the member, the bonding force can be further effectively increased. Moreover, extending the end portion of the lead wire may increase the end surface area of the lead wire. Also, it is preferred that the chemical corrosion of the fixed portion can be prevented by providing a certain kind of a film not so as to expose this fixed portion directly to outside air.

(2) Manufacturing Method

Next, the manufacturing method of the resistance element of the present invention will be described below for each component of the resistance element.

<1> Substrate

The shape of a substrate is usually formed as a cylindrical one in the case of the resistance element of the present invention. Although a plate-like resistance element exists, the cylindrical substrate is preferable. This is because the directionality is not important in the case where the cylindrical substrate is mounted in the sensor. In addition, it is easy to install the resistance element thereto, and the cylindrical substrate has a high strength against bending stress and thermal shock.

The substrate may be a solid cylinder (round bar) or a hollow cylinder as long as it is cylindrical. However, it is necessary to reduce thermal capacity in order to improve thermal response, and it is preferred that the outside diameter be about 0.4 to 1.0 mm and that the length in the axial direction be about 1.5 to 3 mm. The substrate is formed of an insulating material, usually, insulating ceramics such as alumina. The substrate can be manufactured by compacting the insulating ceramic powder by a known conventional compacting method such as pressing and by sintering the resultant compact.

The resistor is formed so as to connect both ends of the substrate on the outer peripheral surface of the substrate. As materials for the resistor, a material whose resistance value increases with temperature rise, for example, the Pt group metals, Au, Ni or a mixture containing any one of them can be given used. However, in consideration of high melting points and high chemical stability, it is preferred that the material be Pt or a mixture containing Pt.

The shape of the resistor is not particularly limited. However, for example, a film-like resistor such as a thin film resistor or a thick film resistor can be used, and such film resistors can be formed by conventional known film forming methods such as vacuum deposition, sputtering, plating and dipping. It is preferred that a formed film be subjected to heat treatment in order to crystallize a component material (for example, Pt) or in order to strongly bond the film to the substrate surface. Although the heat treatment temperature depends on the material or film forming method, the above-described effect can be obtained by performing heat treatment at temperatures from 600 to 1200° C. in the case of Pt.

The control of the resistance value of the resistor may be performed by adjusting the sectional area of the passage of electric current by film thickness or by mixing an insulating material in the resistor. However, it is preferable to adopt a method that involves spirally cutting the film on the outer peripheral surface of the substrate by laser trimming etc. thereby to make the resistor long, and adjusting the width and length of the resistor. This is because the adjustment of the resistance value is easy in this method.

<3> Conducting Members

The resistance element of the present invention is provided with cap-shaped conducting members, which are electrically connected to the resistor and are disposed at both ends of the substrate. Usually, the conducting member is used with a lead wire bonded to the external surface thereof. The conducting member connects the electric circuits of the resistance element (i.e., resistor) and sensor, and holds the resistance element firmly. Therefore, it is necessary for the conducting member to have electrical conductivity. For example, a cap fabricated by pressing a metal sheet of about 0.1 to 0.2 mm in thickness and a lead wire of about 0.1 to 0.2 mm in diameter can be preferably used. When the cap-shaped conducting member is fabricated by attaching a small-diameter lead wire thereto as described above, the dissipation of heat by the heat transfer from the substrate is small and this is preferable because the measuring accuracy and response of the sensor can be ensured.

From the viewpoint of corrosion resistance and heat resistance against heat generated during the operation of the sensor, it is preferred that the cap be made of an Fe—Ni alloy, stainless steel, a noble metal or a noble metal alloy.

On the other hand, it is preferable to use, as a lead wire material, a noble metal alloy containing as a main component a noble metal, particularly, platinum, or a base metal core wire covered with a noble metal. This is because that the heat dissipation from the resistance element should be prevented, and lead wire materials should have a low thermal conductivity and corrosion resistance as well.

The bonding of the cap-shaped conducting member to the substrate end can be performed by using a mechanical caulking method, an insertion under press method, a method in which an adhesive is used, etc. singly or in combination as required. Anorganic adhesive such as an acrylic adhesive or an epoxy adhesive can be used. When the importance is attached to weather resistance and heat resistance, it is preferred to use a heat resistant inorganic adhesive such as Aronceramic (brand name), or a glass.

When the substrate is a hollow cylinder, for example, an adhesive is applied to the end surfaces of the substrate, the resultant is inserted under press into conducting members, and thereafter heat is applied to it so as to bond firmly the resultant. In the case of glass, both can be bonded together by performing sintering at a temperature higher than the temperature at which glass is semi-melted. Moreover, it is preferable to round the end edges of the substrate in hollow cylindrical form and forming the ends of the substrate in the shape of a semi-sphere as far as possible since it becomes easy to mount the conducting members. The same thing also applies to a solid cylinder.

Also, the improvement in the working efficiency for inserting the substrate into the conducting members and the firm fixation of the conducting member 4 to the substrate may be attained simultaneously with the formation of an enlarged portion at the vicinity of the opening by widening the inner diameter of the conducting member gradually as it gets closer to the end portion thereof Additionally, it is also possible to prevent the substrate from breakage that might be caused by a poor engagement between them during the insertion step. Furthermore, it is also possible to prevent the resistor formed on the surface of the substrate from being damaged or being stripped off during the insertion of the cap. As a method for forming the enlarged portion in the conducting member at the vicinity of the opening, the conducting member may be processed by forming a tapered form portion in such a manner that the wall thickness of the portion at the vicinity of the end of the opening which corresponds to the width obtained by subtracting the depth C in the inner diameter from the depth C in the outer diameter in FIG. 2 is made thinner gradually toward the opening end, as shown in FIG. 2. This portion may also be formed by widening gradually the inner diameter of the conducting member outwardly without changing the wall thickness. Thus formed enlarged portion in the conducting member forms the gap 7 that is defined by the inner surface of the enlarged portion and the outer surface of the substrate facing thereto, and is widened gradually toward the end of the opening of the conducting member, in a state that the conducting member is capped to the substrate of which outer peripheral surface a temperature sensing resistor is formed.

The material for the protective film will be chosen, depending on the use conditions of the resistance element. A heat resistant resin such as a polyimide or a silicone resin may be used, for example, when the resistance element is exposed to temperatures of about 200° C. Pb-base or Zn-base low-melting glasses having a softening point of Ca. 400 to 800° C. may be used when the resistance element is exposed to temperatures of about 350° C. In all cases, materials of high heat resistance may be preferably used.

For example, it is possible to form a protective film with a film thickness of about 20 $\mu$m on the surface of a temperature sensing resistor by repeating several times an operation comprising the application of a glass having a softening point of 650° C. in paste form to a temperature sensing resistor so as to cover at least the whole surface of the temperature sensing resistor with the glass, and sintering of the resultant at a temperature of 800° C. Indeed, the whole body of the temperature sensing resistor may be covered with a protective film. In the case that the whole body of the temperature sensing resistor is covered with the protective film, the gap 7 is usually filled with a material for forming protective film.

The temperature sensing resistor element manufactured in the above-described manner can preferably be used as the heating resistance element $R_H$ and temperature compensating resistance element $R_C$ of the thermal flow sensor (hereinafter referred to simply as "sensor"), which will be described below.

Figure 3:
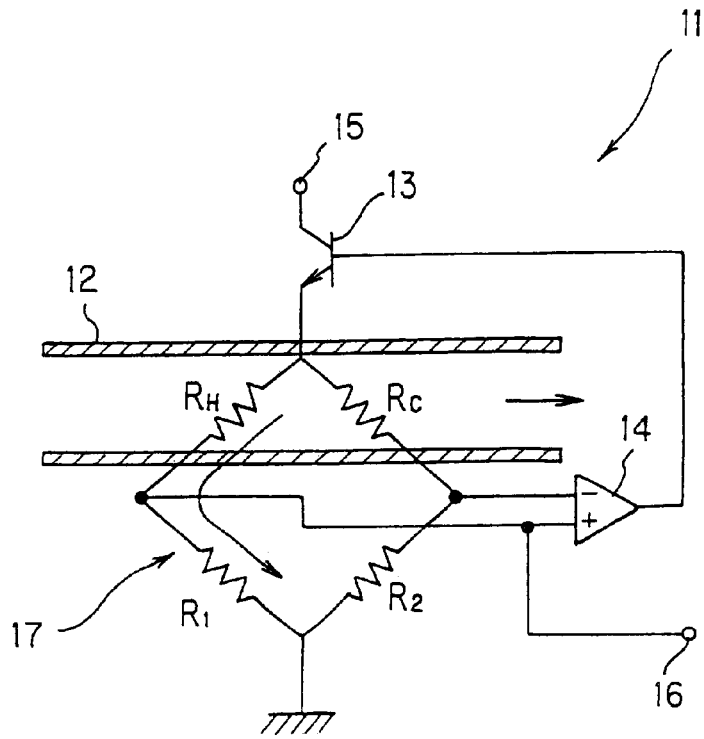
FIG. 3 is a circuit diagram showing the configuration of an electric circuit of a thermal flow sensor.
Figure 4:
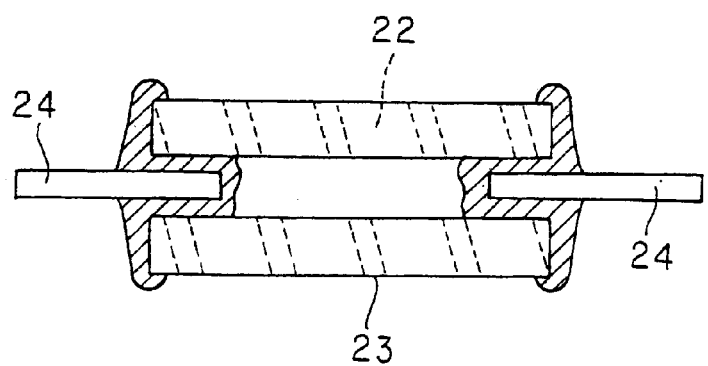
FIG. 4 is a schematic diagram showing the construction of a conventional temperature sensing resistance element.

The sensor is provided with, for example as shown in FIG. 3, two types of temperature sensing resistance elements, i.e., a heating resistance element $R_H$ having resistance value of about 10 to 30 $\Omega$, and a temperature compensating resistance element $R_C$ having resistance value of about 400 to 1000 $\Omega$, fixed resistors $R_1$ and $R_2$ constituting a bridge circuit 17 along with these resistance elements, further a transistor 13, a comparator 14, a terminal 15 to which sensor-driving voltage is applied and the like.

In a sensor 11, the fixed resistors $R_1$ and $R_2$ are disposed outside an intake pipe 12 and the heating resistance element $R_H$ and temperature compensating resistance element $R_C$ are disposed in the interior of the intake pipe 12 that comes into contact with intake air so that the bridge circuit 17 is arranged in balance in order to ensure that the temperature compensating resistance element $R_C$ is held at the same temperature as air temperature within the intake pipe 12, and that the heating resistance element $R_H$ is held at a level higher than the above-described air temperature by a prescribed temperature, such as, for example, at temperature of 200° C.

In other words, when the heating resistance element $R_H$ is cooled by the intake air line the intake pipe 12, a current corresponding to a temperature decrease is supplied to the bridge circuit 17 in order to keep temperature for the heating resistance element $R_H$ at a constant level. Because the voltage at both ends of the fixed resistor R1 changes according to the current supply amount to the bridge circuit 17, it is possible to measure the flow rate of intake air by taking out this voltage as an electrical output 16.

The present invention will be described more concretely by examples. However, the present invention is not limited by these examples.

A solid cylindrical substrate of-having an outside diameter of 0.8 mm and a length of 2.6 mm was firstly prepared, and the end edges were rounded to have a radius of 0.2 mm so as to have an almost semispherical shape. This substrate was produced by adding, to alumina powder containing 92 mass % alumina, polyvinyl alcohol in an amount corresponding to 2 mass % of alumina powder as a binder and an appropriate amount of water as a dispersion medium, mixing them, granulating the resultant mixture by a spray drier, pressing the resultant granulated material, and sintering it at 1650° C.

A temperature sensing resistor was formed as a platinum thin film by depositing Pt in film form on the surface of the substrate by the sputtering method. Into a cage provided within a sputtering system were charged 70,000 pieces of the above-described substrate, and sputtering was performed for about 1 hour at a sputtering power of 550 W. The film thickness was found to be about 1 $\mu$m, as a result of calculations based on the weight of platinum determined by the chemical analysis of platinum deposited on the substrate. After the platinum thin film was thus formed, the platinum was crystallized by subjecting the resultant to thermal treatment at 700° C.

Next, caps that serve as the conducting members were prepared. The material was SUS 304 and the thickness was 0.1 mm. The inside diameter A of the cap at the end portion of the rounded portion (R) of the corner shown in FIG. 2 was 0.78 mm, and the depth C on the inner diameter side was 0.4 mm. The inner shape of the cap was conformed to the shape of the end portion of the substrate, and the radius thereof was made to be 0.2 mm. Furthermore, the cap was expanded in taper shape in direction to the end sides of the opening, with the outside diameter B at the end side being 0.98 mm and the outside diameter depth D of the opening being 0.5 mm.

The caps were mechanically pushed and fixed onto both ends of the substrate on which a temperature sensing resistor comprising a thin film of platinum had been formed. Next, the temperature sensing resistor 2 was formed in such a form as shown in FIG. 1 by trimming, at the width of about 30 $\mu$m of thus formed platinum film at an appropriate interval, the temperature sensing resistor formed on the outer peripheral surface of the substrate with a laser, with taking the cylinder axis of the substrate 3 as the center. The temperature sensing resistor was formed in the form of a band surrounding spirally the outer surface of the substrate in width of 50 $\mu$m and in 18 turns around the cylinder axis of the substrate. A resistance element was obtained by welding platinum-iridium alloy wires of 2.7 mm in length and 0.15 mm in diameter to the cap-shaped conducting members which were fitted to the both ends of the substrate on which the temperature sensing resistor had been formed spirally in a band shape.

Next, a polyimide protective film was formed on the whole surface of the thus produced temperature sensing resistance element according to the procedures specified below. Firstly, the resistance element was dipped in a polyimide solution, then the resultant was gradually lifted up. The dipping was carried out under atmospheric condition in this example. In this case, however, the impregnation of the gaps between the cap and the substrate with polyimide may be achieved surely if a dipping is carried out under such a reduced pressure that polyimide solution does not boil. The substrate to which polyimide had adhered was dried slowly. Then, the resultant was subjected to heat treatment at a temperature of 300° C. to imidization of polyimide. The level-difference portion between the cap end and the platinum thin film was covered continuously with a smoothly curved line, and the weld portion of the lead wire and the conducting member was also completely covered the protective film. The protective film thickness on the platinum thin film was 110 $\mu$m in the level-difference portion and was 30 $\mu$m on average in other portions.

The temperature coefficient of the thus formed temperature sensing resistance on which the protective film had been formed was measured by the following method. First, the resistance element was set in a constant temperature chamber capable of performing programmed operation so as to hold the resistance element at ambient temperatures of −20, 0, 20, 40, 60, 80, and 100° C. for 15 minutes. These 7 levels of ambient temperature were precisely measured by a platinum resistance thermometer, and the resistance value of the temperature sensing resistance elements at each ambient temperature was precisely measured by a four-terminal resistance measurement equipment. By assigning these data to the following equation (1), the temperature coefficient of resistance $\alpha$ and the coefficient of square term of temperature $\beta$ were calculated.

$$R=R_o(1+\alpha T+\beta T^2) \tag{1}$$

wherein $R_o$ means resistance value at 0° C. ($\Omega$), T means temperature (° C.), R means resistance value ($\Omega$) at temperature T (° C.).

After the calculation of the temperature coefficient of resistance a and the coefficient of square term of temperature $\beta$, the resistance value at 25° C. ($R_{25}$) was calculated by taking T in the above equation as 25 (° C.). When the temperature coefficient of resistance $\alpha$ of 100 resistance elements manufactured was measured, it was found to be within a range of 3500±80 ppm/° C. Furthermore, the resistance values were uniformly controlled within the range of 420±20 $\Omega$.

Also, the temperature sensing resistance elements were evaluated in terms of the evaluation items inclusive of the easiness in assembling, the fixation strength of the cap to the substrate in the case that the lead wire is pulled; that is, whether the cap comes out before the break of the lead wire, and range of resistance value at 25° C. The results of the evaluation are shown in Table 1.

Examples 2 to 10 and Comparative Examples 1 to 4

Resistance elements were manufactured in a similar manner to that in Example 1 except that the sizes, shapes, and the like of the substrate and the cap were varied diversely as shown in Table 1. These resistance elements were evaluated in the same manner as that in Example 1. The results of the evaluation are shown in Table 1. Incidentally, the reason why the deviations in resistance value in the results of the evaluation were great in the comparative examples might be that the platinum thin film was damaged or partially stripped off by the edges of the cap.

TABLE 1

| | Number of test pieces | Substrate (mm) | | | Cap (mm) | | | | Easiness in assembling | Fixation strength of cap to substrate in case that lead wire is pulled | Variation in resistance value (%) | Overall judgement |
|---|---|---|---|---|---|---|---|---|---|---|---|---|
| | | Length | OD | Radius of end edge | ID A | OD of opening end B | Depth on ID side C | Depth on OD side D | | | | |
| Example 1 | 5 | 2.6 | 0.8 | 0.2 | 0.78 | 0.98 | 0.4 | 0.5 | Easy | Break of the lead wire | 4.8 | Good |
| Example 2 | 5 | 2.8 | 0.75 | 0.3 | 0.74 | 0.83 | 0.5 | 0.55 | Easy | Break of the lead wire | 3.1 | Good |
| Example 3 | 5 | 2.8 | 0.6 | 0.15 | 0.59 | 0.75 | 0.5 | 0.62 | Easy | Break of the lead wire | 4.5 | Good |
| Example 4 | 5 | 2.8 | 0.49 | 0.1 | 0.49 | 0.64 | 0.4 | 0.45 | Easy | Break of the lead wire | 2.5 | Good |
| Example 5 | 5 | 2.6 | 0.55 | 0.09 | 0.545 | 0.7 | 0.45 | 0.52 | Easy | Break of the lead wire | 3.5 | Good |
| Example 6 | 5 | 2.6 | 0.8 | 0.2 | 0.79 | 0.98 | 0.45 | 0.45 | Easy | Break of the lead wire | 5.0 | Good |
| Example 7 | 5 | 2.8 | 0.75 | 0.3 | 0.745 | 0.83 | 0.58 | 0.58 | Easy | Break of the lead wire | 4.5 | Good |
| Example 8 | 5 | 2.8 | 0.6 | 0.15 | 0.59 | 0.75 | 0.5 | 0.5 | Easy | Break of the lead wire | 4.8 | Good |
| Example 9 | 5 | 2.8 | 0.6 | 0.1 | 0.495 | 0.64 | 0.45 | 0.45 | Easy | Break of the lead wire | 4.0 | Good |
| Example 10 | 5 | 2.6 | 0.55 | 0.09 | 0.545 | 0.7 | 0.5 | 0.5 | Easy | Break of the lead wire | 4.5 | Good |
| Comparative example 1 | 5 | 2.6 | 0.8 | 0.01 | 0.8 | 1.0 | 0.4 | 0.4 | Difficult | Pulling-out of the cap in 2 out of 5 pieces | 8.9 | Not good |
| Comparative example 2 | 5 | 2.8 | 0.75 | 0.00 | 0.75 | 0.87 | 0.5 | 0.5 | Difficult | Pulling-out of the cap in 3 out of 5 pieces | 9.3 | Not good |
| Comparative example 3 | 5 | 2.8 | 0.6 | 0.01 | 0.6 | 0.74 | 0.5 | 0.5 | Difficult | Pulling-out of the cap in 2 out of 5 pieces | 11.1 | Not good |
| Comparative example 4 | 5 | 2.8 | 0.6 | 0.02 | 0.59 | 0.79 | 0.4 | 0.4 | Impossible | — | — | Not good |

Examples 11 and 12 and Comparative Examples 5 and 6

Next, the affects of the state of the protective film and the property of a material for the lead wire on the reliability and the like of the temperature sensing resistance element were investigated, by using thermal flow sensors assembled from resistance elements in which the state of the protective film and the material of the lead wire were varied diversely as shown in Table 2. These sensors were mounted on the intake air pipe of an actual car, an energization test was conducted after 100,000 km of driving, and the condition of the sensor element before and after driving was evaluated. The results of the evaluation are shown in Table 2.

the present invention, the temperature sensing resistance element of the present invention can maintain prescribed resistance characteristics even in a poor environment during practical use. Therefore, a thermal flow sensor in which the temperature sensing resistance element of the present invention is built in a bridge circuit is excellent in reliability and measuring accuracy.

What is claimed is:

1. A temperature sensing resistance element, comprising:
   a substrate formed of an insulating material;
   a temperature sensing resistor formed on at least a part of an outer peripheral surface of said substrate so as to connect both ends of said substrate;

TABLE 2

| | Number of test pieces | Protective film | | Lead wire material | Change after 100,000 km of driving | | Overall judgement |
|---|---|---|---|---|---|---|---|
| | | Material | Level-difference portion | | Appearance | Response | |
| Example 11 | 3 | Polyimide | Smooth covering | Pt—Ir alloy wire | Somewhat dirty | No change | Good |
| Example 12 | 3 | Polyimide | Smooth covering | Pt coated Fe—Ni wire | Somewhat dirty | No change | Good |
| Comparative example 5 | 3 | Polyimide | Smooth covering | Stainless steel wire | Rust formation, weld break in 1 out of 3 pieces | | Not good |
| Comparative example 6 | 3 | Polyimide | Depression exists. | Pt coated Fe—Ni wire | Adhered with lots of dirt | Change | Not good |

As described above, because the disadvantages in the conventional temperature sensing resistance elements are improved in the temperature sensing resistance element of a cap-shaped conducting member having an enlarged portion formed at a vicinity of an opening thereof and being electrically connected to said temperature sensing resistor and disposed at each end of said substrate, and a protective film covering at least said temperature sensing resistor;

wherein a gap is defined by an inner surface of said enlarged portion and a part of said outer surface of said substrate, said gap being widened gradually toward an end of said opening of said conducting member.

2. The temperature sensing resistance element according to claim 1, wherein a level-difference portion formed at a boundary between said opening of said conducting member and said outer surface of said substrate is covered smoothly with a protective film comprising a continuous curved line.

3. The temperature sensing resistance element according to claim 1, wherein a lead wire made of a noble metal alloy or a lead wire whose base metal core wire is covered with a noble metal is fixed at each outer surface of said cap-shaped conducting member.

4. The temperature sensing resistance element according to claim 2, wherein a lead wire made of a noble metal alloy or a lead wire whose base metal core wire is covered with a noble metal is fixed at each outer surface of said cap-shaped conducting member.

5. A thermal flow sensor, comprising a temperature sensing resistance element, said temperature sensing resistance element comprising a substrate formed of an insulating material, a temperature sensing resistor formed on at least a part of an outer peripheral surface of said substrate so as to connect both ends of said substrate, a cap-shaped conducting member having an enlarged portion formed at a vicinity of an opening thereof and being electrically connected to said temperature sensing resistor and disposed at each end of said substrate, a protective film covering at least said temperature sensing resistor, and a gap defined by an inner surface of said enlarged portion and a part of said outer surface of said substrate, said gap being widened gradually toward an end of said opening of said conducting member;

wherein said temperature sensing resistance element is built into a bridge circuit.

6. A temperature sensing resistance element, comprising:

a cylindrical substrate formed of an insulating material;

a temperature sensing resistor formed on an outer peripheral surface of said substrate and connecting both ends of said substrate;

a cap-shaped conducting member having an enlarged portion formed at a vicinity of an opening thereof and being electrically connected to said temperature sensing resistor and disposed at each end of said substrate; and a protective film covering at least said temperature sensing resistor;

wherein the radius of curvature of both end edges of said substrate is 0.05 mm or more.

7. The temperature sensing resistance element according to claim 6, wherein a level-difference portion formed at a boundary between said opening of said conducting member and said outer surface of said substrate is covered smoothly with a protective film comprising a continuous curved line.

8. The temperature sensing resistance element according to claim 6, wherein a lead wire made of a noble metal alloy or a lead wire whose base metal core wire is covered with a noble metal is fixed at each outer surface of said cap-shaped conducting member.

9. The temperature sensing resistance element according to claim 7, wherein a lead wire made of a noble metal alloy or a lead wire whose base metal core wire is covered with a noble metal is fixed at each outer surface of said cap-shaped conducting member.

10. A thermal flow sensor, comprising a temperature sensing resistance element, said temperature sensing resistance element comprising a cylindrical substrate formed of an insulating material, a temperature sensing resistor formed on an outer peripheral surface of said substrate for connecting both ends of said substrate, a cap-shaped conducting member having an enlarged portion formed at a vicinity of an opening thereof and being electrically connected to said temperature sensing resistor and disposed at each end of said substrate, and a protective film covering at least said temperature sensing resistor;

wherein both end edges of said substrate have a radius of curvature of 0.05 mm or more; and wherein said temperature sensing resistance element is built into a bridge circuit.

* * * * *

UNITED STATES PATENT AND TRADEMARK OFFICE
CERTIFICATE OF CORRECTION

PATENT NO. : 6,647,779 B2
DATED : November 18, 2003
INVENTOR(S) : Fujio Ishiguro and Zenji Ishikawa It is certified that error appears in the above-identified patent and that said Letters Patent is hereby corrected as shown below:

Title page, Item [54] and Column 1, lines 1-3,
Please change "TEMPERATURE SENSING RESISTANCE ELEMENT AND THERMAL FLOW SENSOR USING SAME" to -- TEMPERATURE SENSING RESISTANCE ELEMENT AND THERMAL FLOW SENSOR INCLUDING SAME --

Title page,
Item [57], ABSTRACT,
Line 9, please add -- of -- after "surface"

Column 2,
Line 6, please add -- a -- after "invention,"
Line 61, please delete "a-"

Column 4,
Line 65, please delete "given"

Column 6,
Line 41, please change "a temperature" to -- the temperature --

Column 7,
Line 10, please change "line" to -- in --
Line 21, please delete "of-"
Line 22, please change "firstly" to -- first --

Signed and Sealed this

Thirteenth Day of January, 2004

JON W. DUDAS
*Acting Director of the United States Patent and Trademark Office*